ial.  ............ 260/583 R
United States Patent [19]

Kang et al.

[11] Patent Number: 5,331,036

[45] Date of Patent: * Jul. 19, 1994

[54] OIL EXTENDED ULTRA HIGH MOLECULAR WEIGHT ELASTOMERS

[75] Inventors: Jung W. Kang, Clinton; Gary B. Seaver, Canal Fulton; Takatsugu Hashimoto, Akron, all of Ohio

[73] Assignee: Bridgestone Corporation, Tokyo, Japan

[ * ] Notice: The portion of the term of this patent subsequent to Nov. 9, 2010 has been disclaimed.

[21] Appl. No.: 34,969

[22] Filed: Mar. 23, 1993

Related U.S. Application Data

[63] Continuation of Ser. No. 586,064, Sep. 21, 1990, Pat. No. 5,260,370.

[51] Int. Cl.$^5$ .................................. C08K 5/01
[52] U.S. Cl. .................................. 524/474; 524/575; 525/314; 526/173; 526/340
[58] Field of Search .................. 524/474, 575; 525/314; 526/173, 340

[56] References Cited

U.S. PATENT DOCUMENTS

| | | | |
|---|---|---|---|
| 2,964,083 | 12/1960 | Pfau et al. | 172/332 |
| 3,135,716 | 6/1964 | Uranick et al. | 260/45.5 |
| 3,159,587 | 12/1964 | Uranick et al. | 252/431 |
| 3,193,590 | 7/1965 | Hsieh | 260/665 |
| 3,296,150 | 1/1967 | Kahle | 252/431 |
| 3,303,225 | 2/1967 | Hsieh et al. | 260/665 |
| 3,377,404 | 4/1968 | Zellinski | 260/680 |
| 3,438,957 | 4/1969 | Hsieh | 260/94.1 |
| 3,640,899 | 2/1972 | Naylor | 252/431 R |
| 3,644,322 | 2/1972 | Farrar | 260/94.2 |
| 3,668,263 | 6/1972 | Morrison et al. | 260/665 R |
| 3,725,368 | 4/1973 | Morrison et al. | 260/84.7 |
| 3,769,267 | 10/1973 | Cheng et al. | 260/83.7 |
| 3,784,637 | 1/1974 | Farrar | 260/448.2 Q |
| 3,787,510 | 1/1974 | Farrer | 260/665 R |
| 3,886,127 | 5/1975 | Furukawa et al. | 260/82.1 |
| 3,903,168 | 9/1975 | Foss et al. | 260/583 R |
| 3,954,894 | 5/1976 | Kamienski | 260/665 R |
| 3,975,453 | 8/1976 | Smith | 260/665 R |

(List continued on next page.)

OTHER PUBLICATIONS

Rempp et al, Synthesis of Model Macromolecules, Anionic Polymerization, ACS, 1981, 59–70.
H. E. Adams et al., in Kautschuk and Gummi, Kunststoffe 18, Jahrgang, pp. 709–716, Nov. 1965.
Makowski et al, J. Macromol. Sci–Chem. E2(4) pp. 683–700, Jul. 1968.

*Primary Examiner*—Paul R. Michl
*Assistant Examiner*—Edward Cain
*Attorney, Agent, or Firm*—Daniel N. Hall

[57] ABSTRACT

Elastomer compositions comprising (A) ultra high molecular weight copolymer compositions of 1,3-conjugated dienes and aromatic vinyl compounds having a weight average molecular weight of greater than about 1,000,000 and (B) oil are described. The ultra high molecular weight copolymer compositions which are also characterized as having an intrinsic viscosity in tetrahydrofuran of at least about 4.0 may be obtained by a process which comprises polymerizing a 1,3-conjugated diene and a vinyl aromatic compound in a hydrocarbon solvent in the presence of a trimetalated 1-alkyne catalyst which comprises the reaction product of a 1-alkyne containing at least 4 carbon atoms, an organo metallic compound R°M and a 1,3-conjugated diene wherein R° is a hydrocarbyl group, M is an alkali metal, the mole ratio of R°M to 1-alkyne is about 3:1 and the mole ratio of conjugated diene to 1-alkyne is from about 2:1 to about 30:1. The oil extended elastomer compositions of the present invention preferably contain large amounts of oil such as 80 parts or higher per 100 parts of copolymer.

13 Claims, 1 Drawing Sheet

U.S. PATENT DOCUMENTS

| | | | |
|---|---|---|---|
| 3,984,387 | 10/1976 | Lui et al. | 526/74 |
| 4,028,484 | 6/1977 | Morton et al. | 526/335 |
| 4,075,253 | 2/1978 | Horlei et al. | 260/665 R |
| 4,189,555 | 2/1980 | Massoubre | 526/179 |
| 4,196,154 | 4/1980 | Tung et al. | 260/665 R |
| 4,201,848 | 5/1980 | Kotani et al. | 525/314 |
| 4,339,397 | 7/1982 | Ishihara et al. | 260/665 R |
| 4,399,078 | 8/1983 | Morrison | 260/663 R |
| 4,413,098 | 11/1983 | Hattori et al. | 525/314 |
| 4,429,091 | 1/1984 | Hall | 526/181 |
| 4,471,093 | 9/1984 | Furukawa et al. | 525/237 |
| 4,497,748 | 2/1985 | Vitus et al. | 260/665 R |
| 4,572,263 | 2/1986 | Ogawa et al. | 152/537 |
| 4,677,165 | 1/1987 | Kikuchi et al. | 525/332.9 |
| 4,748,199 | 5/1988 | Takiguchi et al. | 524/318 |
| 4,791,178 | 12/1988 | Fujimaki et al. | 525/332.6 |
| 4,822,530 | 4/1989 | Bronstert et al. | 260/665 R |
| 4,826,911 | 5/1989 | Suzuki et al. | 524/526 |
| 4,835,209 | 5/1989 | Kitagawa et al. | 524/507 |
| 4,835,216 | 5/1989 | Marikawa et al. | 525/77 |
| 4,859,748 | 8/1989 | Priddy et al. | 526/88 |
| 4,866,131 | 9/1989 | Fujimaki et al. | 525/96 |

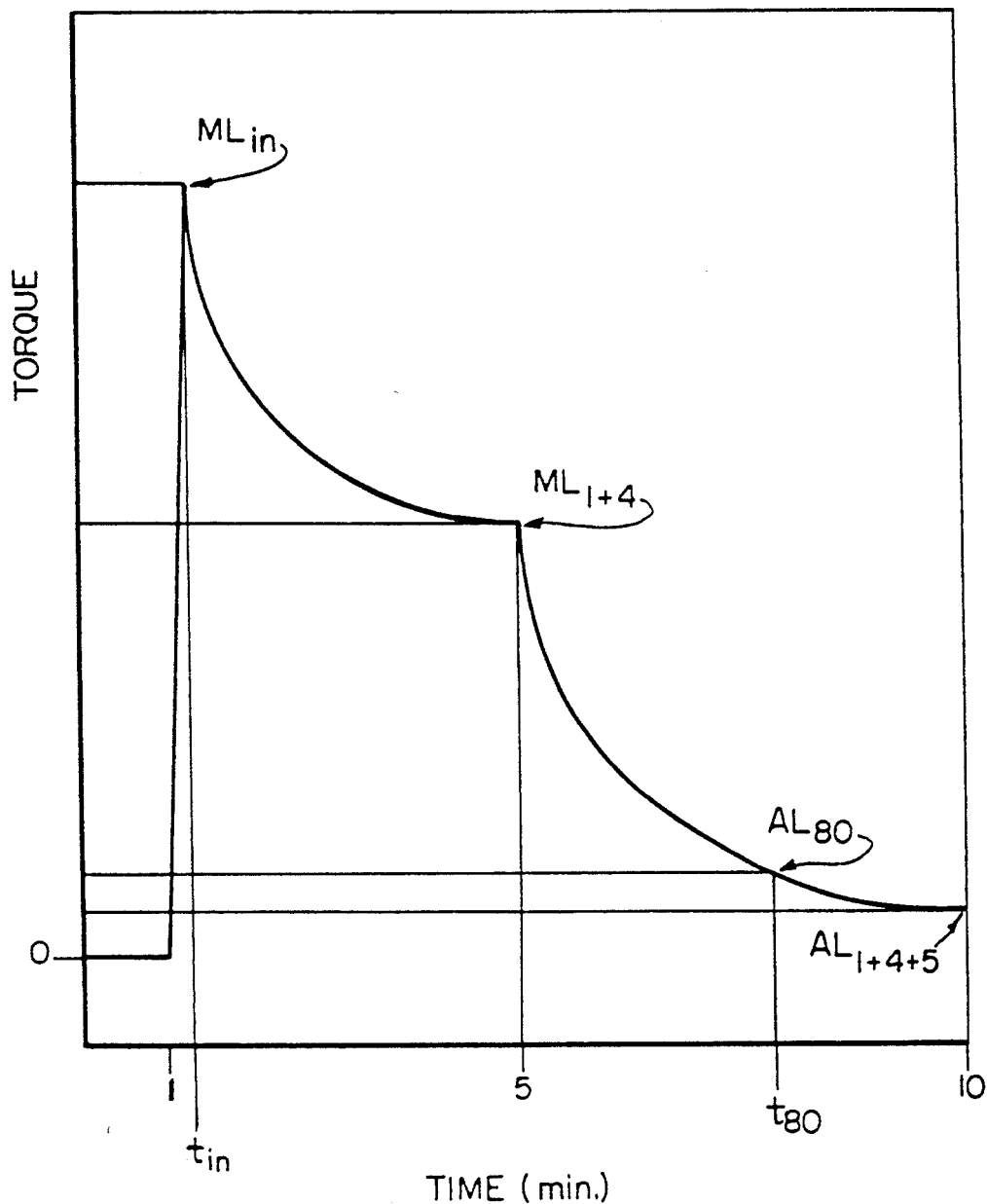

OIL EXTENDED ULTRA HIGH MOLECULAR WEIGHT ELASTOMERS

This application is a continuation of application Ser. No. 07/586,064, filed Sep. 21, 1990, now U.S. Pat. No. 5,260,370.

TECHNICAL FIELD OF THE INVENTION

This invention relates to elastomer compositions comprising (A) ultra high molecular weight copolymers of conjugated dienes such as 1,3-butadiene and aromatic vinyl compounds such as styrenes and (B) extender oil. More particularly, this invention relates to such compositions wherein the copolymers are prepared using a trimetalated 1-alkyne catalyst.

BACKGROUND OF THE INVENTION

The incorporation of oil into elastomeric compositions is known to improve the properties of the elastomer composition. The incorporation of large amounts of oil is desirable since it generally results in higher hysteresis loss. In some instances, however, attempts to include large amounts of oils into elastomeric compositions result in loss of other desireable properties such as rupture strength, wear resistance, and heat resistance.

The polymerization of conjugated dienes such as 1,3-conjugated dienes to form elastomeric homopolymers and copolymers utilizing various initiator systems is known. For example, such polymerizations can be initiated with organometallic compounds wherein the metal is a Group I metal such as lithium. These polymers and copolymers of conjugated dienes are useful for tire rubbers, molded rubber goods, molding compounds, surface coatings, etc.

Various organometallic compounds have been described in the literature as useful in the polymerization and copolymerization of conjugated dienes. Among the catalysts which have been proposed are various alkali metal acetylides. For example, U.S. Pat. No. 3,303,225 describes the use of metalated 1-acetylenes as active catalysts in the polymerization of vinylidene-containing monomers. Alkali metal acetylides containing one or more metal atoms are prepared by reacting an organo alkali metal compound with an acetylene under conditions to effect step-wise replacement of, first, the acetylenic hydrogen atom, and, second, the hydrogen atoms attached to the carbon atom which is alpha to the acetylenic linkage.

U.S. Pat. No. 4,677,165 describes rubber compositions useful particularly for tire treads which comprise: a styrene-butadiene copolymer rubber prepared by random copolymerization of styrene with 1,3-butadiene by solution polymerization techniques utilizing an organic lithium compound as catalyst; from 80 to 250 phr of carbon black having a surface area of 100 to 400 m$^2$/g; and 30 to 280 phr of an aromatic oil. It is essential that the styrene-butadiene copolymer satisfies six requirements as identified in the specification and claims including the presence of one or more specific groups introduced into a molecular terminal or chain of the copolymer.

U.S. Pat. No. 2,964,083 describes curable rubber tire tread stock and pneumatic tires having a tread portion made of such stock. The tread stock comprises a copolymer containing a major amount of a conjugated diolefinic compound and a minor amount of a copolymerizable monoolefinic compound such as styrene, a fine reinforcing high abrasion carbon black and at least 30 parts by weight of a compatible soft oil per 100 parts by weight of the copolymer.

Styrene-butadiene elastomers comprising blends of different styrene-butadiene copolymers are described as being useful for treads of high performance tires in U.S. Pat. No. 4,866,131. The elastomers can be extended with oil to increase the hysteresis loss value. Aromatic oils having a viscosity gravity constant according to ASTM D-2501 in the range of 0.900 to 1.100 are described as suitable. The use of a low temperature plasticizer ester and/or a naphthenic or paraffinic softener to improve the properties of carbon black filled styrene-butadiene rubbers is described in U.S. Pat. No. 4,748,199.

U.S. Pat. No. 4,791,178 describes rubber compositions for use in tires which comprise certain mixtures of copolymers of a conjugated diene and monovinyl aromatic hydrocarbons. To obtain high hysteresis loss, the patentees suggest that an extender oil be blended into rubber compositions in amounts of from 30–200 parts by weight based on 100 parts by weight of the rubber component. Amounts of from 50 to 200 parts of oil are preferred. The use of 60 to 200 parts by weight of carbon black having an average particle size of not more that 300 Å also is disclosed as producing rubber composition with high hysteresis loss.

SUMMARY OF THE INVENTION

Elastomer compositions comprising (A) ultra high molecular weight copolymer compositions of 1,3-conjugated dienes and aromatic vinyl compounds having a weight average molecular weight of greater than about 1,000,000 and (B) oil are described. The ultra high molecular weight copolymer compositions which are also characterized as having an intrinsic viscosity in tetrahydrofuran of at least about 4.0 may be obtained by a process which comprises polymerizing a 1,3-conjugated diene and a vinyl aromatic compound in a hydrocarbon solvent in the presence of a trimetalated 1-alkyne catalyst which comprises the reaction product of a 1-alkyne containing at least 4 carbon atoms, an organo metallic compound R°M and a 1,3-conjugated diene wherein R° is a hydrocarbyl group, M is an alkali metal, the mole ratio of R°M to 1-alkyne is about 3:1 and the mole ratio of conjugated diene to 1-alkyne is from about 2:1 to about 30:1. The oil extended elastomer compositions of the present invention preferably contain large amounts of oil such as 80 parts or higher per 100 parts of copolymer.

BRIEF DESCRIPTION OF THE DRAWING

The drawing is a graph of torque versus time identifying the points $ML_{in}$, $ML_{1+4}$, $AL_{80}$ and $AL_{1+4+5}$ used in determining percent relaxation of the copolymers used in the invention.

DESCRIPTION OF THE PREFERRED EMBODIMENTS

The elastomer compositions of the present invention comprise (A) an ultra high molecular weight copolymer composition of 1,3-conjugated dienes and aromatic vinyl compounds having a weight average molecular weight of greater than about 1,000,000 and (B) oil. In preferred embodiments, the elastomer compositions of the present invention will contain large amounts of oil such as from about 30 to about 300 parts by weight of oil per 100 parts by weight of the copolymer (A).

(A) Ultra High Molecular Weight Copolymers.

The copolymers useful in the present invention are of the type generally referred to as ultra high molecular weight copolymer compositions. In particular, the copolymer compositions are obtained by copolymerizing 1,3-conjugated dienes with aromatic vinyl compounds. The ultra high molecular weight copolymer compositions obtained in accordance with the present invention are essentially free of gel and are further characterized as having a weight average molecular weight of greater than about 1,000,000. Ultra high molecular weight copolymer compositions can be prepared by the method of the present invention having a weight average molecular weight of greater than 1,100,000. Other characterizing features of the ultra high molecular weight copolymers include inherent viscosity, dilute solution viscosity and percent relaxation as determined using a Mooney viscometer. In one embodiment, the copolymer compositions are characterized as having an intrinsic viscosity ($\eta$) in tetrahydrofuran of at least 4.0, and in another embodiment, the copolymers have an intrinsic viscosity in tetrahydrofuran of at least about 4.5.

The ultra high molecular weight compositions useful in the invention may also be characterized in terms of percent relaxation as determined by a procedure which will be discussed more fully below. In one embodiment, the compositions are characterized by percent relaxation values of at least about 30% to 100%, and more particularly relaxations of from about 30% to about 70%.

The ultra high molecular weight compositions also may be characterized as having a dilute solution viscosity in toluene of at least about 3.5 dl/g, and in one embodiment, the copolymers will have a dilute solution viscosity of at least about 4.0 dl/g. The ultra high molecular weight copolymers generally will be characterized by an Mw/Mn of at least about 1.9, more often, between about 2.0 and 5.0.

The copolymer compositions also may be characterized by their molecular weight distribution. The copolymer compositions contain a large fraction of copolymer having a number average molecular weight of greater than 1,000,000 and a small fraction of copolymer having a number average molecular weight of less than 100,000. In one embodiment of the present invention, the copolymer is characterized as comprising at least 30%, preferably more than about 35% by weight of a fraction having a number average molecular weight of greater than 1,000,000, and less than 8% by weight, preferably less than 5% by weight, of a fraction having a number average molecular weight of less than 100,000.

The copolymer compositions useful in the present invention are copolymers of a 1,3-conjugated diene monomer and an aromatic vinyl monomer. The relative amount of conjugated diene and aromatic vinyl monomers included in the copolymers may be varied over a wide range depending upon the desired copolymer properties. Thus, the amount of conjugated diene in the copolymer may vary from 10 to about 90% by weight and the amount of aromatic vinyl compound from about 10 to about 90% by weight. More generally, the copolymers will comprise from about 50 to about 90%, preferably from about 50 to about 80% by weight of the conjugated diene and from about 10 to about 50% by weight, more preferably from about 20 to about 50% by weight of the aromatic vinyl compound.

Monomers.

The conjugated diene monomers useful in preparing the copolymers generally are 1,3-dienes, and they contain from 4 to 12 carbon atoms and preferably from 4 to 8 carbon atoms per molecule. Examples of these dienes include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-butadiene, 2,3-di-n-propyl-1,3-butadiene, 2-methyl-3-isopropyl-1,3-butadiene, and the like. Among the dialkyl butadienes, it is preferred that the alkyl groups contain from 1 to 3 carbon atoms. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene.

The aromatic vinyl compounds include styrene, 1-vinyl-naphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include p-methylstyrene, alpha-methylstyrene, 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 2,6-dimethyl-4-hexoxystyrene, 4-dlmethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinyl-naphthalene, 2,4-diisopropyl-1-vinyl-naphthalene, 3,4,5,6-tetramethyl-1-vinylnaphthalene, 3,6-di-n-hexyl-1-vinyl-naphthalene, 8-phenyl-1-vinyl-naphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinyl-naphthalene, 4-p-tolyl-2-vinylnaphthalene, 5-(3-phenyl-n-propyl)-2-vinylnaphthalene, 4-methoxy-1-vinylnaphthalene, 6-phenoxyl-1-vinylnaphthalene, 3,6-dimethylamino-1-vinylnaphthalene, and the like. Other examples of vinyl substituted aromatic compounds are found in U.S. Pat. No. 3,377,404, the disclosure with respect to which is incorporated herein by reference. Preferred aromatic vinyl compounds include the styrenes, particularly, styrene.

Preferred copolymers are those obtained from 1,3-butadiene, isoprene or piperylene with styrene. More particularly, copolymers of 1,3-butadiene and styrene are preferred.

Catalyst

In one embodiment, the ultra high molecular weight copolymers useful in the present invention are obtained by polymerizing a 1,3-conjugated diene and an aromatic vinyl compound in the presence of a catalyst which is a trimetalated 1-alkyne. The trimetalated 1-alkyne catalysts are characterized by the formula

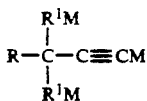

wherein R is a hydrocarbyl group, M is an alkali metal, $R^1$ is a divalent oligomeric hydrocarbyl group comprising moieties derived from a 1,3-conjugated diene, and the total number moieties derived from a 1,3-conjugated diene in all of the $R^1$ groups in Formula I is from about 2 to about 30.

The hydrocarbyl group R may be a saturated aliphatic, saturated cycloaliphatic or an aromatic group generally containing up to about 20 carbon atoms. In one embodiment, R is an alkyl group containing from 1 to 15 carbon atoms. In another embodiment, R is an alkyl group containing 1 to 6 carbon atoms. In yet another embodiment, R is an alkyl group containing from about 3 to 9 carbon atoms. M is an alkali metal including lithium, sodium, potassium, rubidium, cesium and francium. Lithium, sodium and potassium are preferred alkali metals, and lithium is the most preferred alkali metal.

The substituent $R^1$ is a divalent oligomeric hydrocarbyl group comprising moieties derived from a 1,3-conjugated diene. The conjugated dienes may be any of a variety of 1,3-conjugated dienes including those containing from 4 to 12 carbon atoms, and preferably from 4 to 8 carbon atoms per molecule. Specific examples of the conjugated dienes include: 1,3-butadiene; isoprene; 2,3-dimethyl-1,3-butadiene; 1,3-pentadiene(piperylene); 2-methyl-3-ethyl-1,3-butadiene; 3-methyl-1,3-pentadiene; 1,3-hexadiene; 2-methyl-1,3-hexadiene; 1,3-heptadiene; 1,3-octadiene; etc. In one preferred embodiment, the moieties of the oligomeric group $R^1$ are derived from 1,3-butadiene, isoprene or piperylene.

The number of moieties derived from a conjugated diene in the $R^1$ groups of the composition of Formula I may be varied over a range of from 2 to about 30. Generally, the total number of moieties derived from a conjugated diene in the two $R^1$ groups in the composition of Formula I is from about 3 to about 30. In one preferred embodiment, the total number of conjugated diene derived moieties in all of the $R^1$ groups in the composition of Formula I is from about 8 to about 20. The number of moieties derived from a conjugated diene in the oligomeric groups $R^1$ can be varied to provide compositions of Formula I having a weight average molecular weight of from about 200 to about 3000. In one preferred embodiment, the weight average molecular weight of the compositions of Formula I is within a range of from about 800 to about 2000. The hydrocarbon-soluble trimetalated 1-alkyne compositions characterized by Formula I can be obtained by reacting a 1-alkyne containing at least 4 carbon atoms, an organometallic compound R°M, and a conjugated diene at a temperature above about 70° C., wherein the mole ratio of R°M to 1-alkyne is about 3:1. The 1-alkyne may be represented by the formula

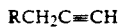 $RCH_2C\equiv CH$ (II)

wherein R is a hydrocarbyl group. Representative examples of such 1-alkyne compounds include 1-butyne; 1-hexyne; 1-octyne; 1-decyne, 1-dodecyne; 1-hexadecyne; 1-octadecyne; 3-methyl-1-butyne; 3-methyl-1-pentyne; 3-ethyl-1-pentyne; 3-propyl-6-methyl-1-heptyne; 3-cyclopentyl-1-propyne; etc.

The organometallic compound may be represented by the formula R°M wherein R° is a hydrocarbyl group which may be a saturated aliphatic group, a saturated cycloaliphatic group, or an aromatic group. Generally, R° will contain up to about 20 carbon atoms. M is an alkali metal including lithium, sodium, potassium, rubidium, cesium and francium. Representative examples of the organometallic compound R°M include: methylsodium, ethyllithium; propyllithium; isopropylpotassium, n-butyllithium, s-butyllithium; t-butylpotassium; t-butyllithium; pentyllithium; n-amylrubidium; tert-octylcesium; phenyllithium; naphthyllithium; etc. The conjugated dienes which are reacted with the intermediate to form the desired compositions are preferably 1,3-conjugated dienes of the type which have been described above.

In a preferred embodiment, the trimetalated 1-alkyne catalysts are prepared by the method which comprises the steps of (a) reacting a 1-alkyne with an organometallic compound R°M in a mole ratio of about 1:3 to form an intermediate, and (b) reacting said intermediate with a conjugated diene at a temperature of at least about 70° C. The mole ratio of conjugated diene to 1-alkyne in the reaction is at least about 2:1 and may be as high as about 30:1. More generally, the ratio will be in the range of from about 8:1 to 20:1.

The reaction of the 1-alkyne with the organometallic compound followed by reaction with the conjugated diene can be carried out in the presence of an inert diluent, and particularly, in the presence of a hydrocarbon such as an aliphatic, cycloaliphatic or aromatic hydrocarbon. Representative examples of suitable hydrocarbon diluents include n-butane, n-hexane, isooctane, decane, dodecane, cyclohexane, methylcyclohexane, benzene, toluene, xylene, etc. Preferred hydrocarbons are aliphatic hydrocarbons containing from four to about 10 carbon atoms per molecule. Mixtures of hydrocarbons can also be utilized.

The reaction between the 1-alkyne and the organometallic compound to form the intermediate can be effected at temperatures of 20°–30° C., and the reaction is generally conducted in an inert atmosphere such as under nitrogen. The reaction generally is conducted at atmospheric pressure. The intermediate obtained from the first step is a trimetalated alkyne which is either insoluble or only slightly soluble in hydrocarbons, The reaction between the intermediate and the conjugated diene to form a hydrocarbon soluble product is conducted at a temperature above 70° C. and more generally at a temperature of from about 70° C. to about 150° C. The reaction generally is completed in less than about 5 hours, and the reaction results in a change in the color of the solution from a yellow to red or reddish brown. At about 80° C. the reaction is completed in about 3 hours. At higher temperatures, the reaction is completed in less than 3 hours. If the reaction mixture is heated for too long a period, the catalytic activity of the resulting product may be reduced. The product of this reaction is a trimetalated alkyne containing two divalent oligomeric hydrocarbyl groups comprising moieties derived from the conjugated diene. Relatively small amounts of the conjugated diene are reacted with the intermediate in the second step. The mole ratio of conjugated diene to 1-alkyne in the intermediate is at least about 2:1 and may be as high as 30:1. In one preferred embodiment, the mole ratio of conjugated diene to 1-alkyne is in a range of from about 8:1 to about 20:1.

The trimetalated compounds used in this invention contain active as well as inactive metal. The presence of at least two different types of carbon metal linkages in the compositions of this invention can be shown by both chemical and physical evidence. Gilman titration with allyl bromide distinguishes between metal acetylide (—C≡C—M) which is Inactive and other carbon metal linkages (—C—C—M) which are active, *J. Organometal Chem.*, 1 (1963) 8. Titration of the compositions of this invention show about 67% of the total carbon-metal linkages are "active" corresponding to trimetalated alkynes. Ultraviolet and visible spectral studies show peak absorbances at 300-340 NM and 400-450 NM for the compositions of this invention corresponding to inactive and active metal linkages, respectively.

An important property of these catalyst compositions is that they are soluble in hydrocarbon solvents. The terms "soluble in hydrocarbon solvents" and "hydrocarbon soluble" as used in the specifications and claims indicate that the materials (polymer) are soluble in hydrocarbons, particularly aliphatic hydrocarbons such as n-hexane, to the extent of at least about 5 grams of material per 100 grams of solvent at about 25° C. The solutions are stable in an inert atmosphere at room temperature for an extended period of time.

The following examples illustrate the preparation of the hydrocarbon soluble trimetalated 1-alkyne compositions useful as catalysts.

Additional examples or useful catalysts are found in copending U.S. Pat. No. 5,147,051. The disclosure of this patent is hereby incorporated by reference for its description of additional catalysts.

Unless otherwise indicated in the following examples and elsewhere in the specification and claims, all parts and percentages are by weight, temperatures are in degrees centigrade and pressure is at or near atmospheric pressure.

EXAMPLE A

To a solution of 0.55 ml. of 1-octyne (3.73 mM) in dry hexane contained in a 7-ounce bottle equipped with rubber liner and three-hole crown cap are charged 7 ml. of n-butyllithium (11.2 mM, 1.6M solution) through a disposable syringe at room temperature under nitrogen. The resulting slurry is shaken vigorously to complete the reaction, and the resulting pale yellow solution is allowed to stand at room temperature for one hour. To this solution is charged 25 gms. of 1,3-butadiene in hexane (24.2% butadiene, 112 mM butadiene). The mixture is tumbled in a bath heated to about 80° C. for three hours, and the resulting reddish brown solution is cooled and stored. Analysis of the solution obtained in this manner but the Gilman technique indicates active carbon-lithium linkage of 63.6%. The calculated active carbon-lithium linkage based on 1,3,3-trilithio-octyne is 66.7%.

EXAMPLE B

To a one-gallon reactor equipped with thermometer, stirrer, heating means, pressure means, inlet and outlet ports are charged 450 gms. of dry hexane, 436 gms. (1008 mM) of n-butyllithium (1.54M) in hexane, and a solution of 37 gms. (336.3 mM) of 1-octyne in 35 gms. of dry hexane. The reaction mixture is maintained under a nitrogen atmosphere as the n-butyllithium and octyne are added to the reactor. After the above ingredients are added to the reactor, the mixture is stirred at room temperature for 30 minutes under nitrogen, and 816.5 gms. of a 1,3-butadiene/hexane blend containing 200 gms. of 1,3-butadiene are added to the reactor. This mixture is stirred at 85° C. for 120 minutes whereupon a homogeneous reddish-brown solution is obtained. This solution is allowed to cool to room temperature and transferred to storage tank under a nitrogen atmosphere. Gilman's titration indicates the presence of 62.34% active carbon-lithium linkages at 0.2628 molarity. The calculated active carbon-lithium linkage is 66.7%.

Two-hundred grams of the catalyst solution is coagulated with excess methanol in the presence of an antioxidant (e.g., 1% di-tertiary-butyl-para cresol). The resulting oily product is dried at 50° C. under vacuum. Gel permeation chromatography analysis of the product indicates a 1123 Mw.

Polymerization

The copolymers useful in the present invention are prepared by polymerizing the conjugated diene and the vinyl aromatic compound in a hydrocarbon solvent in the presence of the above-described trimetalated 1-alkyne catalyst. The polymerization temperature may range from about 0° C. to about 160° C. or higher, but generally, the polymerization is conducted at a temperature of between about 75° C. and 150° C. for a period of from about 10 minutes to 2 or 3 hours. In a preferred embodiment, the polymerization is conducted at a temperature in the vicinity of about 100° C. for a period of about 15 minutes to one hour. The desired ultra high molecular weight copolymers can be obtained consistently at this relatively high temperature in a relatively short period of time. Effecting polymerization with about 100% conversion in one hour or less allows for more effective use of labor and equipment which represents a substantial savings in the commercial production of the copolymers. The copolymers may be random or block copolymers, but random copolymers are preferred.

The actual temperature utilized in the polymerization reaction will depend upon the desired polymerization rate, the product desired, and the particular catalyst or catalyst system utilized. The polymerization may be conducted under a negative pressure or an elevated pressure to avoid a loss of monomer and solvent, particularly when the temperatures used are at or above the boiling point of either or both. Also, an inert atmosphere such as nitrogen can be used, and the usual precautions are taken to exclude materials such as water and air that will inactivate or poison the catalyst.

The polymerization reaction is generally conducted in a hydrocarbon solvent or diluent. Various hydrocarbon solvents can be used including aliphatic, cycloaliphatic and aromatic hydrocarbons. In one embodiment, aliphatic hydrocarbons such as hexane and cyclohexane are preferred. Examples of the aliphatic hydrocarbons useful as solvent/diluent in the polymerization reaction generally will contain from about 3 to about 20 carbon atoms, and more preferably from about 5 to about 10 carbon atoms. Examples of such aliphatic hydrocarbons include butane, pentane, hexane, heptane, octane, decane, etc. Cycloalkanes containing from 5 to 20 and preferably from 5 to about 10 carbon atoms also are useful. Examples of such cycloalkanes include cyclopentane, cyclohexane, methyl cyclohexane, and cycloheptane. Aromatic solvents which may be utilized include benzene, toluene and xylene. Individual diluents can be employed, or combinations of hydrocarbons such as a hydrocarbon distillate fraction may be utilized.

In many applications, it is desirable to increase the ratio of 1,2-structure in the copolymers In order to increase the cure rate in free radical cure systems. Various compositions, referred to in the art as modifier compositions, can be included in the copolymerization mixture to increase the amount of 1,2-structure in the copolymers. Any of the modified compositions which have been described in the prior art which will combine with the trimetalated 1-alkyne catalyst of the present invention to produce ultra high molecular weight copolymers having increased amounts of 1,2-structure can be utilized in the method of the present invention. Modifier compounds which have been found to be particularly useful in combination with the trimetalated 1-alkyne catalyst are those selected from the group consisting of linear and cyclic oligomeric oxolanyl alkanes. These types of modifier compounds are described in U.S. Pat. No. 4,429,091, and the disclosure of U.S. Pat. No. 4,429,091 relating to such modifier compositions, particularly the disclosure in Cols. 3 and 4, is hereby incorporated by reference. The oxolanyl modifiers can be prepared, for example, by reacting furan which is unsubstituted in either or both of the 2- or 5-positions, with either an aldehyde or a ketone (e.g., acetone) in the presence of an acid such as hydrochloric acid. Control of the reaction parameters results in the production of a product containing up to 95% of dimers, trimers and tetramers. Once the linear oligomers or cyclic structures are formed, these reaction products are hydrogenated in the presence of suitable hydrogenation catalysts such as nickel base catalysts to produce the desired oxolanyl compounds.

Examples of oligomeric modifiers for use with the trimethylated 1-alkyne catalysts of the present invention include: bis(2-oxolanyl)methane; 2,2-bis(2-oxolanyl) propane; 1,1-bis(2-oxolanyl) ethane; 2,2-bis(2-oxolanyl) butane; 2,2-bis(5-methyl-2-oxolanyl)propane; and 2,2-bis(3,4,5-trimethyl-2-oxolanyl)propane.

The molar ratio of the oxolanyl modifiers to the trimetalated 1-alkyne catalyst can vary from about 1:20 to about 20:1, more often from about 1:10 to 10:1. In one preferred embodiment, the molar ratio is from about 0.5:1 to 3:1.

Other materials useful as modifiers in the process of this invention include Lewis bases which may be, for example, ethers or tertiary amines. Specific examples of such modifiers include diethyl ether, dibutyl ether, tetrahydrofuran, 2-methoxytetrahydrofuran, 2-methoxymethyl tetrahydrofuran, 2,2'-di(tetrahydrofuryl) propane, ethyleneglycol dimethylether, ethyleneglycol diethylether, ethyleneglycol dibutylether and the like; triethylamine, 1,2-dipiperidinoethane, pyridine, N,N,N',N'-tetramethylethylenediamine, N,N,N',N'-tetraethylenediamine, N-methylmorpholine, triethylenediamine, tripiperidinophosphine oxide and the like.

The amounts of trimetalated 1-alkyne catalyst and the optional modifier(s) utilized in the polymerization reaction are amounts designed to result in the formation of a copolymer having the desired properties described above. The amounts utilized in a particular copolymerization reaction will depend upon a number of factors including the types and amounts of monomers being copolymerized, the desired molecular weight and molecular weight distribution, etc. One of the desirable features of the catalyst used in the method of the invention is that only small amounts of the catalysts are required to produce the desired copolymer, and this results in a cost savings.

The millimole ratio of the catalyst to the weight of the monomers which is employed in the preparation of the copolymers is expressed as the number of millimoles of active metal in the catalysts based on metal per 100 grams of monomer (PHGM). In the trimetalated 1-alkyne catalyst of the present invention wherein the metals are in the 1,3,3-positions, the metal in the 1-position is inactive whereas the metals in the 3-position are active metals. Generally, the ratio of millimoles of active metal PHGM may range from about 0.4 to about 0.7. At the higher ratios, the weight average molecular weight of the copolymers of the present invention tends to decrease. Thus, in one preferred embodiment, the ratio of millimoles of active metal PHGM will range from about 0.45 to about 0.65.

The term 1,2-units or 1,2-microstructure as used in the present application refers to the mode of addition of a growing polymer chain with a conjugated diene monomer unit. Either 1,2-addition or 1,4-addition can occur. In terms of nomenclature, this results in a 1,2-unit or microstructure for the monomer unit in the polymer chain when 1,3-butadiene is a monomer. When isoprene is the monomer, 3,4-microstructure most generally results with a smaller amount of 1,2-microstructure in the polymer chain. Naming of the polymer structure which results from 1,2-addition is thus dependent on the monomers being polymerized. For simplicity, the term 1,2-unit or 1,2-microstructure is employed to determine the microstructure which results from 1,2-addition of conjugated dienes. The microstructure of the ultra high molecular weight copolymers of the present invention is determined using proton NMR. The copolymers useful in this invention can be prepared containing relatively high amounts of 1,2 units (vinyl) such as from 30 to 80% by weight of 1,2 units.

Samples may be withdrawn from the reactor periodically during the polymerization reaction to determine percent conversion (by measuring the total solids), color and character of the reaction mass. The reaction time of the polymerization is dependent upon several factors including the polymerization temperature and the catalyst concentration. Generally complete conversion to polymer can be obtained at temperatures of about 100° C. in about 15 minutes to one hour.

When the polymerization reaction has progressed to the desired degree, the product can be dropped from the reactor or combined with an alcohol such as methanol or isopropanol, or other liquid medium which deactivates the initiator and coagulates and precipitates the polymer product. Generally, an amount of isopropanol equal in weight to the amount of diluent (e.g., hexane) used is sufficient to effect coagulation and precipitation. It is also customary and advantageous to include an antioxidant such as about 1% of di-tertiary butyl paracresol in the isopropanol. The polymer product is recovered and dried to remove solvent.

Since the initially formed and unquenched polymer solutions obtained in accordance with the method of the invention contain terminal metal atoms (e.g., lithium atoms) on the polymer molecules, the unquenched polymer solutions can be treated with various reagents to introduce functional groups by replacing the terminal metal atoms. For example, the unquenched copolymer solutions can be treated with various reagents to introduce terminal functional groups such as —SH, —OH, —COOH, halogen, etc. Carboxyl groups can be introduced by treating the unquenched solution with carbon dioxide, and hydroxy groups can be introduced by treating the unquenched polymer solution with epoxy compounds. The procedures for introducing such groups into the unquenched copolymer solutions containing terminal metal atoms are well known to those skilled in the art.

The molecular weights and the dilute solution viscosity (DSV) in toluene of the copolymers reported herein, are determined by techniques described in U.S. Pat. No. 5,147,951. The disclosures regarding molecular weight and DSV determinations are hereby incorporated by reference.

The intrinsic viscosity ($\eta$) of the copolymers used in the present invention is determined by the general procedure utilized for DSV except that the intrinsic viscosity is the average of four data points obtained with four different concentrations.

The glass transition temperature (Tg) of the copolymers used in the present invention is determined using a DuPont 1090 thermal analyzer with a 910 Differential Scanning Calorimeter System and following the manufacturer's recommended procedure. The onset, inflection and offset temperatures are calculated in accordance with the Interactive DSC Data Analysis-Program V2D.

The relaxation properties of the copolymers used in the present invention are determined using a Bendix Scott STI/200 Mooney Viscometer and a modification of the conventional method for measuring the "shearing viscosity" of rubber and rubber-like materials such as SBR. In this procedure, the sample is placed between the platens which are then closed. The sample is warmed at 100° C. for one minute, and the rotor is turned on. After four minutes, the Mooney value ($ML_{1+4}$) is determined and the rotor is turned off. Measurement of the relaxation is begun, and a relaxation time ($AL_{80}$) is recorded when the torque reaches 20% ($T_{80}$) of the Mooney value $ML_{1+4}$. After a total of 10 minutes, the torque is again observed and recorded as $AL_{1+4+5}$, and the platens are opened. The percent relaxation is calculated as follows:

$$\text{Percent relaxation} = \frac{Al_{1+4+5}}{ML_{1+4}} \times 100$$

A typical graph of the torque versus time for this test procedure is shown in the drawing wherein the various values utilized in computation of percent relaxation such as $ML_{1+4}$ and $AL_{1+4+5}$ are noted. In general, the copolymers used in the present invention are characterized by a percent relaxation as defined above of from about 20% to about 80%. More often, the percent relation will be between about 30 or even 40% and about 70%. The Mooney viscosity ($ML_{1+4}$@100° C.) of the copolymers is greater than 200.

The following examples illustrate the copolymers useful in the present invention and methods for their preparation. Additional examples of copolymers are found in U.S. Pat. No. 5,147,951. The disclosure of this patent is hereby incorporated by reference for its description of additional coplymers.

Unless otherwise indicated in the following examples and elsewhere in the specification and claims, values for number average molecular weight (Mn) and weight average molecular weight (Mw) are determined in tetrahydrofuran using GPC as described above. The microstructure of the copolymers (e.g., 1,4 units, 1,2 units, etc., is determined utilizing proton NMR in carbon disulfide.

EXAMPLE 1

To a two-gallon stainless steel reactor equipped with thermometer, stirrer, heating means, pressure means, inlet and outlet ports which is maintained under a nitrogen atmosphere, there are charged 4190 grams of a styrene/butadiene/hexane blend containing 155.3 grams of styrene and 622.3 grams of 1,3-butadiene, 9.25 ml. of 2,2'-di(tetrahydrofuryl) propane in 20 ml. of hexane, and 17.5 ml. of the uncoagulated catalyst solution of Example B (0.211 molar solution in hexane). The polymerization is conducted at 100° C. for 60 minutes. The resulting copolymer is dropped into a five-gallon container equipped with polyethylene liner and containing two gallons of hexane, about 1% of di-tertiary butyl-para-cresol and 25 ml. of a short-stop. The physical properties of the polymer prepared in this manner are summarized in the following Table II.

TABLE II

| | |
|---|---|
| $ML_{1+4}$ (@ 100° C.) | >200 |
| GPC Analysis | |
| Mn ($\times 10^{-4}$) | 44.5 |
| Mw ($\times 10^{-4}$) | 111.4 |
| Mw/Mn | 2.5 |
| $[\eta]_{THF}$ | 7.55 |
| DSV | 6.72 |
| % Gel | 0.00 |
| Wt. % Styrene | 21.6 |
| Wt. % Block Styrene | 0.00 |
| Wt. % 1,2 (Bd Base) | 46.0 |
| Tg (°C.) | −49.9 |

EXAMPLE 2

Example 1 is substantially repeated with the exception that the blend consists of 4.43% styrene, 14.18% 1,3-butadiene, 81.39% hexane, the total amount of blend charged is 4287 grams, and 7.6 mM of 2,2'-di(tetrahydrofuryl) propane and 3.8 mM of the catalyst of Example B are employed.

The resultant copolymer shows a styrene content of 25.2% by weight, a 1,2-microstructure content in the butadiene portion of 48.3% (based on butadiene=100); a DSV of 5.12 dl/g with no gel; $[\eta]_{THF}$ of 5.98; $ML_{1+4}$ at 100° C. $\geq$7200; a weight average molecular weight (Mw) of 1,191,358; a Mw/Mn ratio of 2.99 as determined by GPC; and a Tg of −45.7° C.

EXAMPLES 3-4

Example 1 is substantially repeated with the exception that the blend composition is varied in each polymerization. Hexane, styrene, 1,3-butadiene in the amounts shown in Table III are placed in a two gallon reactor under a nitrogen atmosphere. The polymerization is carried out for 60 minutes under the conditions shown in Table III.

TABLE III

| | 3 | 4 |
|---|---|---|
| Polymerization Conditions | | |
| Hexane (g) | 3745 | 3745 |
| Styrene (g) | 154 | 270 |
| 1,3-Butadiene (g) | 618 | 533 |
| Modifier (mM) | 9.25 | 7.40 |
| Initiator (mM) | 3.69 | 3.08 |

TABLE III-continued

|  | 3 | 4 |
|---|---|---|
| Polymerization Temperature | | |
| Initiation Temp. (°C.) | 20 | 20 |
| Set Temp. (°C.) | 110 | 120 |
| Max. Temp. (°C.) | 149 | 140 |
| Polymerization Conversion (%) | 100 | 100 |
| Properties of Polymer | | |
| Wt. % Styrene | 21.6 | 35.7 |
| Wt. % 1,2 (100% Bd Base) | 52.6 | 45.5 |
| $ML_{1+4}$ @ 100° C. | >200 | >200 |

EXAMPLES 5-7

Example 1 is substantially repeated with the exception that the blend composition is varied in each polymerization. The amounts of hexane, styrene and 1,3-butadiene and the reaction conditions are shown in Table IV.

TABLE IV

|  | 5 | 6 | 7 |
|---|---|---|---|
| Polymerization Conditions | | | |
| Hexane (g) | 3745 | 3745 | 3745 |
| Styrene (g) | 270 | 270 | 270 |
| 1,3-Butadiene (g) | 533 | 533 | 533 |
| Modifier (mM) | 8.68 | 5.20 | 8.70 |
| Active Li (mM) | 3.47 | 3.47 | 2.76 |
| Polymerization Temperature | | | |
| Initiation Temp. (°C.) | 20 | 20 | 20 |
| Set Temp. (°C.) | 120 | 120 | 120 |
| Max. Temp. (°C.) | 134 | 137 | 140 |
| Polymerization Conversion (%) | 100 | 100 | 100 |
| Properties of Polymer | | | |
| Wt. % Styrene | 36.1 | 35.5 | 35.4 |
| Wt. % 1,2 (100% Bd Base) | 59.2 | 45.9 | 45.6 |
| Mn ($\times 10^{-4}$) | 45.9 | 44.6 | 60.1 |
| Mw ($\times 10^{-4}$) | 123.4 | 156.3 | 164.5 |
| Mw/Mn | 2.69 | 3.50 | 2.74 |
| $ML_{1+4}$ @ 100° C. | >200 | >200 | >200 |

EXAMPLE 8

The procedure of Example 1 is repeated except that blend composition is varied. The resultant copolymer shows: a styrene content of 21.6%; a 1,2 microstructure content of 46.0%; $[\eta]_{THF}$ of 7.35; and $ML_{1+4}$ at 100° C. of >200.

(B) Oil.

The second component of the elastomer compositions of the present invention is oil which serves as an extender of the above-described copolymers. Any oil which is compatible with and capable of extending the ultra high molecular weight copolymer compositions can be used in the preparation of the elastomer compositions of the present invention. Thus, the oils may be either natural or synthetic oils provided that they are compatible with the copolymers and capable of extending the copolymers. Natural oils, and in particular, petroleum base oils such as mineral oils, are preferred types of oil useful in the present invention. The oils may be naphthenic oils, paraffinic or aromatic oils. These oils are substantially hydrocarbon oils, often hydrocarbon mineral oils, usually petroleum base oils. A number of specific useful oils are disclosed in U.S. Pat. No. 2,964,083, and in particular in Table 1 in columns 9-12 and U.S. Pat. No. 4,748,199, column 5 line 27-37. These patents are hereby incorporated by reference for their disclosure of specific oils useful as extenders in this invention.

The American Society for Testing and Materials has suggested and published the following classification for oil types (ASTM designation, D-2226).

| Types | Asphaltenes max., % | Polar Compounds max., % | Saturated Hydrocarbons, % |
|---|---|---|---|
| 101 | 0.75 | 25 | 20 max. |
| 102 | 0.5 | 12 | 20.1 to 35 |
| 103 | 0.3 | 6 | 35.1 to 65 |
| 104 | 0.1 | 1 | 65 min. |

The alternative classification of highly aromatic, aromatic, naphthenic, and paraffinic corresponds to the 101, 102, 103 and 104 types, respectively.

Most often, the oils will be blends comprising various mixtures of naphthenic, or paraffinic or aromatic oils. In one embodiment, the oil should have a boiling point above 230° C. and preferably above 290° C. Mineral oils having low aniline point or high aromatic content are preferred, particularly when the rubber contains high amounts of styrene and other aromatic components. Aromatic oils generally are characterized as having a viscosity gravity content (VGC) as determined by ASTM procedure D-2501 of from 0.900 to 1.100. Naphthenics and paraffins generally have a VGC of less than 0.900.

The particular oil which is selected for blending with the copolymers will be determined by the intended use of the rubber article being produced. For example, where the oil extended composition is to be used for tires utilized in cold climates, it is desired that the rubber treads have low temperature flexibility, and this may be accomplished by utilizing hydrocarbon oils of low pour point. In such instances, the oils may have boiling points lower than the 230° C. indicated above.

It has been discovered that the elastomers of the present invention comprising the above-described copolymers and oil can be prepared containing very large amounts of oil, and in particular, the elastomer compositions of the present invention can be prepared containing from 30 or 50 to about 300 parts of oil per 100 parts of copolymer without loss of desirable properties. Blends comprising 80, 100, 150 or even 250 parts of oil per 100 parts of copolymer are easily prepared and have been found to exhibit desirable and useful properties.

The elastomer compositions of the present invention comprising blends of copolymer and oil can be prepared by any of the techniques known to those skilled in the art. For example, the blends can be prepared on roll mills or in internal mixers such as a Banbury mixer. When it is desired to prepare elastomer compositions of the present invention containing high amounts of oil, the oil may be blended with the copolymer with incremental additions of the oil or with a single addition of the oil. Alternatively, the oil can be added to a latex of the copolymer.

The elastomer compositions comprising the copolymers (A) and the oil (B) are useful in a variety of applications such as in the formation of load bearing or damping materials such as may be utilized as dampers for large structures such as towers and buildings. Vulcanizable compositions comprising the elastomer compositions of the present invention can be utilized in tires, fenders, belts, hoses, window frames and other industrial products. The elastomer compositions of the present invention also may be compounded to form compositions which are not curable, and such compositions can be utilized in applications such as sealants, caulks, adhesives, etc.

When curing agents are mixed with the elastomer compositions of the present inventions they may be conventional types such as sulfur- or peroxide-based curing systems. They are used in conventional amounts and incorporated in the uncured compositions of the invention by known techniques and procedures. Fillers may be, and often are present as is known to those skilled in the art. Typical fillers include carbon blacks, glass, silica, talc and similar finely divided mineral materials. In addition to the fillers, other materials normally used in conventional rubber formulations such as antioxidants, accelerators, retarders, promoters and the like may be incorporated into the compositions of the invention.

The vulcanizable (curable) compositions containing the elastomer compositions of the present invention can be prepared by conventional techniques using various types of mills, blenders and mixers known in the art. The cured compositions can be made by the same techniques followed by curing.

The temperature used in formulating the elastomer compositions of this invention range from ambient to those normally used in the art such as 75°-175° or even higher depending upon a particular modified elastomer composition being processed. Because of the sheer forces involved in formulating the elastomer compositions, the formulation process is exothermic and high temperatures are normal.

The vulcanizates of the present invention are made by vulcanizing a mixture comprising at least one of the elastomer compositions of the invention, fillers, conventional curing systems and agents such as sulfur, antioxidants, accelerators, retarders, coupling agents, promoters, etc. The vulcanizates are prepared by curing these compositions under conditions of temperature and time customarily used in the art. Typically, the elastomer composition and fillers are mixed, the sulfur and accelerators are added, and the mixture is cured.

The following examples illustrate the various elastomer compositions of the present invention.

EXAMPLE I

The hexane-diluted product obtained in Example 1 is extended with 130 parts of an aromatic oil per 100 parts of the copolymer followed by drum-drying. Whereas the Mooney viscosity ($ML_{1+4}$@100° C.) of the copolymer of Example 1 is greater than 200, the Mooney viscosity of the oil extended copolymer of this example is 31.5. The glass transition temperature of the oil extended copolymer is −47.5° C.

EXAMPLE II

The copolymer prepared in Example 2 is extended with a naphthenic oil (Flexon 641 from Exxon Oil Co.) and an aromatic oil (Sundex 750T from Sun Refining and Marketing Company) at different oil levels, and the Mooney viscosity and the processability of the resulting elastomer are determined. The processability or workability of the polymer is evaluated using 8-inch rolls of a drum-dryer at a constant 150° C. Evaluation for polymer recovery is made in accordance with the 5-point method wherein point 1 (worst) is given to a sample exhibiting such high adhesion that at the end of the test, it is very difficult to peel the sample from the roll surfaces. The different oil levels and the results obtained are summarized in the following Table V.

TABLE V

| Type of Oil | PHR | $ML_{1+4}$ @ 100° C.* | Polymer Recovery (Drum-Dry) |
|---|---|---|---|
| Naphthenic Oil | 37.5 | >200.0 | 5 |
| | 60.0 | 68.3 | 5 |
| | 80.0 | 56.4 | 5 |
| | 100.0 | 40.1 | 4 |
| | 120.0 | 35.5 | 3 |
| Aromatic Oil | 37.5 | >200.0 | 5 |
| | 60.0 | 67.5 | 5 |
| | 80.0 | 55.7 | 5 |
| | 100.0 | 46.1 | 5 |
| | 120.0 | 39.0 | 4 |
| | 150.0 | 30.4 | 2 |

*Mooney Viscosity; Bendix Scott STI/200

EXAMPLES III–VI

The copolymers of Examples 3–7 are blended with various amounts of Sundex 750T oil as shown in Table VI, and the Mooney viscosity and processability for polymer recovery are determined. The results of these determinations are summarized in the following Table VI.

TABLE VI

| Example | Copolymer of Example | Oil PHR | $ML_{1+4}$ | Polymer Recovery Rating |
|---|---|---|---|---|
| III | 3 | 80 | 62.8 | 5 |
| | | 100 | 48.8 | 5 |
| | | 150 | 30.4 | 2 |
| IV | 4 | 215 | 17.0 | 1 |
| V | 5 | 152 | 24 | 2 |
| VI | 6 | 100 | 39 | 5 |
| VII | 7 | 150 | 28 | 3 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An elastomer composition comprising
   (A) an ultra high molecular weight copolymer composition of a 1,3-conjugated diene and an aromatic vinyl compound having a weight average molecular weight of greater than about 1,000,000 and a vinyl content in the diene base of from 30 to 80% by weight; and
   (B) from about 30 to about 300 parts by weight of oil per 100 parts by weight of the copolymer (A).

2. The elastomer of claim 1 wherein the oil is at least one naphthenic, paraffinic or aromatic oil or mixtures thereof.

3. The elastomer composition of claim 1 comprising at least about 80 parts by weight of the oil per 100 parts by weight of elastomer.

4. The elastomer composition of claim 1 wherein the weight average molecular weight of the copolymer (A) is greater than 1,100,000.

5. The elastomer composition of claim 1 wherein the intrinsic viscosity in tetrahydrofuran of the copolymer (A) is at least about 4.0.

6. The elastomer composition of claim 1 wherein the dilute solution viscosity in toluene of the copolymer composition is at least about 3.5 dl/g.

7. The elastomer composition of claim 1 wherein the copolymer (A) comprises at least 30% by weight of a high molecular weight copolymer fraction having a number average molecular weight of greater than 1,000,000 and less than about 8% by weight of a low molecular weight copolymer fraction having a number average molecular weight of less than 100,000.

8. The elastomer composition of claim 1 wherein the copolymer (A) comprises from about 50 to about 90% by weight of the conjugated diene and from about 10 to about 50% by weight of the aromatic vinyl compound.

9. The elastomer composition of claim 1 wherein the conjugated diene of (A) is 1,3-butadiene, isoprene or piperylene.

10. The elastomer composition of claim 1 wherein the aromatic vinyl compound of (A) is a styrene.

11. The elastomer composition of claim 1 wherein copolymer (A) is obtained by polymerizing a mixture of 1,3-butadiene and a styrene.

12. The elastomer composition of claim 1 wherein the $\overline{M}w/\overline{M}n$ ratio of copolymer (A) is from 2.0 to 5.0.

13. The elastomer composition of claim 1 wherein the $\overline{M}w/\overline{M}n$ ratio of copolymer (A) is from 2.5 to 5.0.

* * * * *